United States Patent
Reikerås et al.

[11] Patent Number: 6,120,099
[45] Date of Patent: Sep. 19, 2000

[54] HEAD-REST

[75] Inventors: Karen Reikerås, Göteborg; Martin Lindström, Stenkullen, both of Sweden

[73] Assignees: Autoliv Development, Vårgårda; AB Volvo, Göteburg, both of Sweden

[21] Appl. No.: 09/147,966
[22] PCT Filed: Sep. 24, 1997
[86] PCT No.: PCT/SE97/01611
　§ 371 Date: Sep. 21, 1999
　§ 102(e) Date: Sep. 21, 1999
[87] PCT Pub. No.: WO98/13228
　PCT Pub. Date: Apr. 2, 1998

[30]　　Foreign Application Priority Data

Sep. 24, 1996　[SE]　Sweden .................................. 9619860

[51] Int. Cl.⁷ .............................. A47C 1/10; B60R 22/28
[52] U.S. Cl. ........................................... 297/391; 297/406
[58] Field of Search ..................................... 297/391, 406, 297/407, 284.11

[56]　　References Cited

U.S. PATENT DOCUMENTS 4,205,878　6/1980　Wooten .

FOREIGN PATENT DOCUMENTS

0470051A1　2/1992　European Pat. Off. .
3039934A1　5/1982　Germany .
2302268A　1/1997　United Kingdom .

*Primary Examiner*—Anthony D. Barfield
*Attorney, Agent, or Firm*—Venable; George H. Spencer; Robert Kinberg

[57]　　ABSTRACT

A head-rest for a motor vehicle seat defines a front face and two side faces. The headrest has two extendable elements which are initially totally retained in the head-rest, but which are adapted to move, with a sliding motion, to an extended position. The elements then extend laterally relative to the head-rest and forwardly relative to the head-rest providing additional support for the head of an occupant of the seat.

8 Claims, 4 Drawing Sheets

HEAD-REST

BACKGROUND OF THE INVENTION

1. Field of the Invention

The present invention relates to a head-rest, and more particularly relates to a head-rest for use in a motor vehicle.

2. Description of the Related Art

It is common to provide a head-rest on a seat in a motor vehicle. A principal function of the head-rest is to prevent the head of the occupant moving rearwardly, relative to the torso of the occupant, in the event that a rear impact should arise. Also, the head-rest prevents the head of an occupant of the vehicle moving in an undesirable way when the occupant moves back into the seat after being restrained by a seat-belt and/or air-bag, following a frontal impact. However, a head-rest may also find an additional use, especially by a passenger in a motor vehicle, where the head-rest may provide support for the head of the passenger, especially if the passenger wishes to rest or sleep.

A typical head-rest only provides a relatively small area upon which to rest the head. One reason for this is to enable rear seat passengers to enjoy a forward view. In order to provide improved comfort it has been proposed to provide, on a head-rest, elements which move from a retracted position to an extended position, in order to provide more support. For example, U.S. Pat. No. 4,205,878 discloses an arrangement in which two elements are provided, one located on each side of the central part of the head-rest, the elements being movable axially, that is to say in a direction extending towards the front of the seat, in order to provide improved support. However, the the forwardly extended position, is relatively small.

SUMMARY OF THE INVENTION

The present invention seeks to provide an improved head-rest.

According to this invention there is provided a head-rest for a motor vehicle seat, the head-rest defining a front face adapted to support the head of an occupant of the seat, and side parts located on either side of the front face, the head-rest having two extendable elements, each adapted to move from a retracted position to an extending position, the extendable elements being adapted to move, with an arcuate sliding motion, from the retracted position through the side parts of the head-rest to an extended position in which the elements extend laterally relative to the head-rest and forwardly relatively to the head-rest.

Preferably each extendable element comprises means adapted to engage a rail of arcuate form associated with the head-rest, each element being movable in a slidable manner along the rail.

Conveniently the rail is defined within the headrest.

Advantageously the rail comprises two opposed arcuate recesses, and each movable element has an arcuate plate, the opposed edges of which are received within the opposed recesses.

In one embodiment the recesses are formed in the upper and lower walls of a substantially hollow tubular housing that extends transversely of the head-rest.

Preferably the front face of each extendable element is upholstered.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE PREFERRED EMBODIMENT

Figure 1:
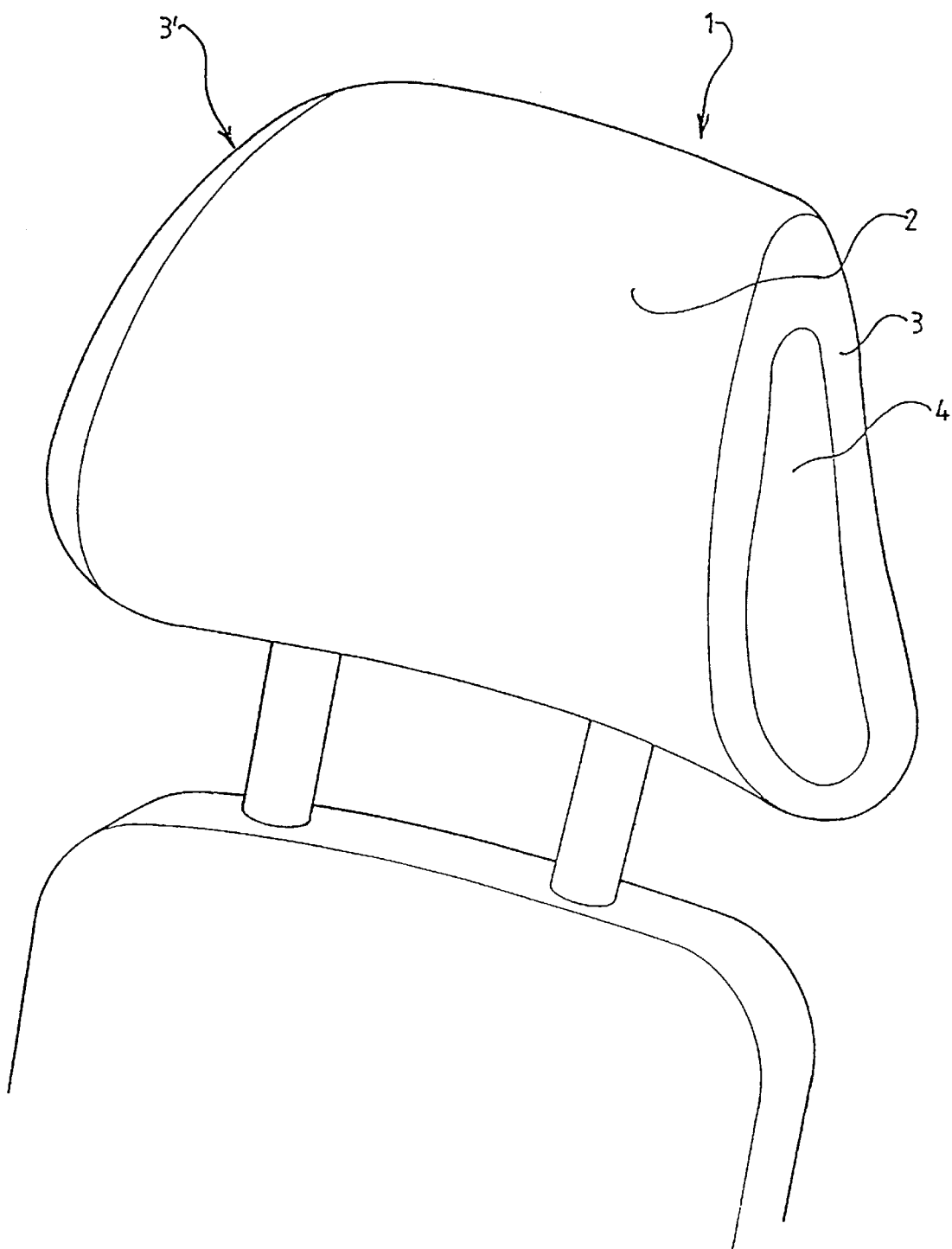
FIG. 1 is a perspective view of a head-rest for a seat in a motor vehicle in a first condition.
Figure 2:
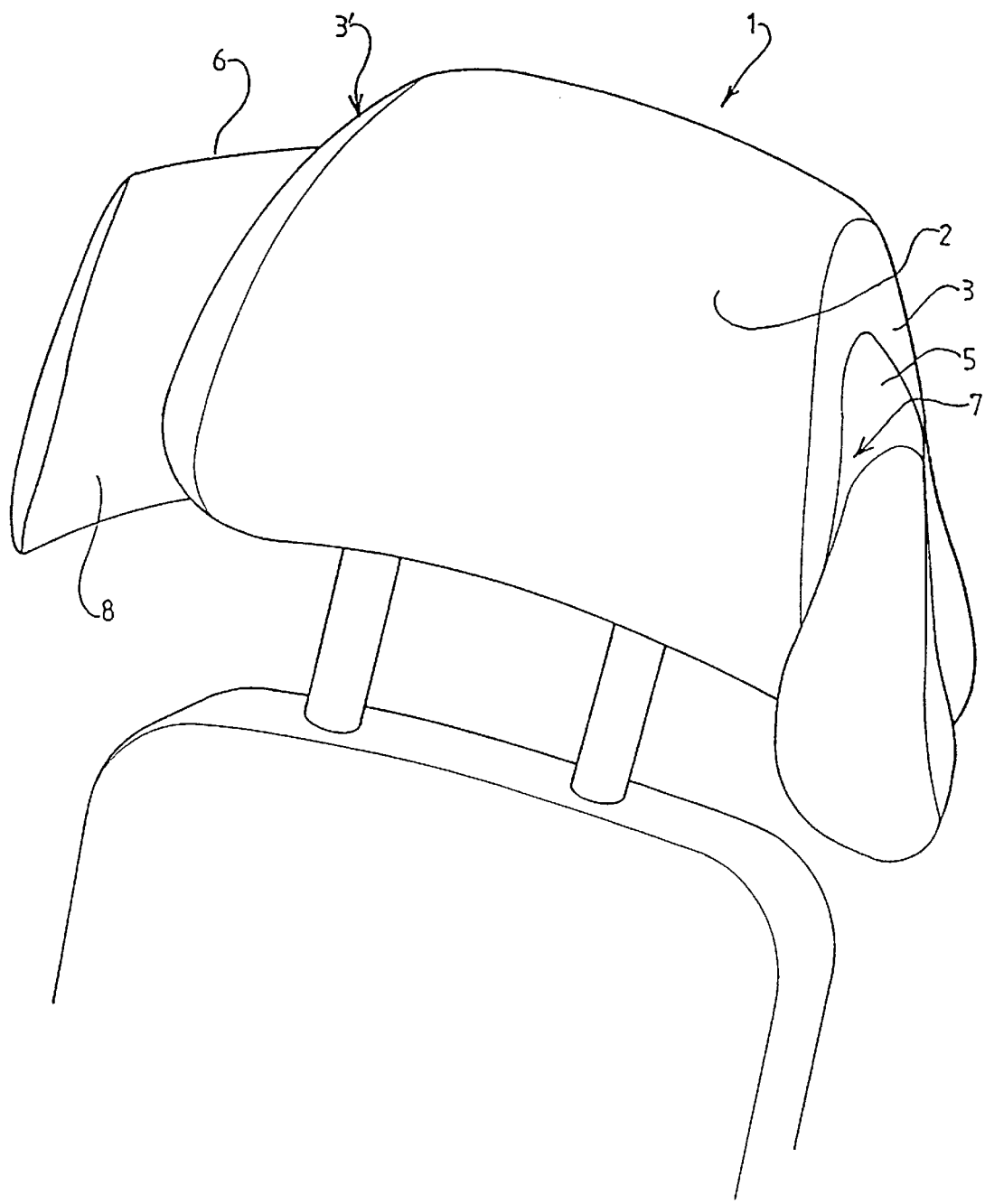
FIG. 2 is a view corresponding to FIG. 1 showing the head-rest in a second condition.

Referring initially to FIGS. 1 and 2 of the accompanying drawings, a head-rest 1 to be mounted on a vehicle seat presents a front face 2 which may be constituted by fabric, or by a thin layer of plastic material, which may simulate leather, or by real leather, which is located in front of interior padding.

The head-rest presents two side faces 3,3'. A central region of each side face 3,3' is formed by one end 4 of an extendable element 5,6 which can be moved from a retracted position, as shown in FIG. 1, in which the extendable elements 5,6 are totally retained within the head-rest 1, to a position as shown in FIG. 2 in which the extendable elements 5,6 extend laterally outwardly and forwardly from the side faces 3,3' of the head-rest 1. The extendable elements are movable manually from the retracted position as shown in FIG. 1 to the extended position shown in FIG. 2. The forwardly directed face 7,8 of each of the extendable elements 5,6 may be covered with fabric, or a layer of plastic material, which may simulate leather, or may be covered with real leather, and padding is located behind the fabric or the layer of plastic so that the front face 7,8 of each of the extendable elements 5,6 forms a comfortable surface against which the occupant of the seat may rest his head.

Figure 3:
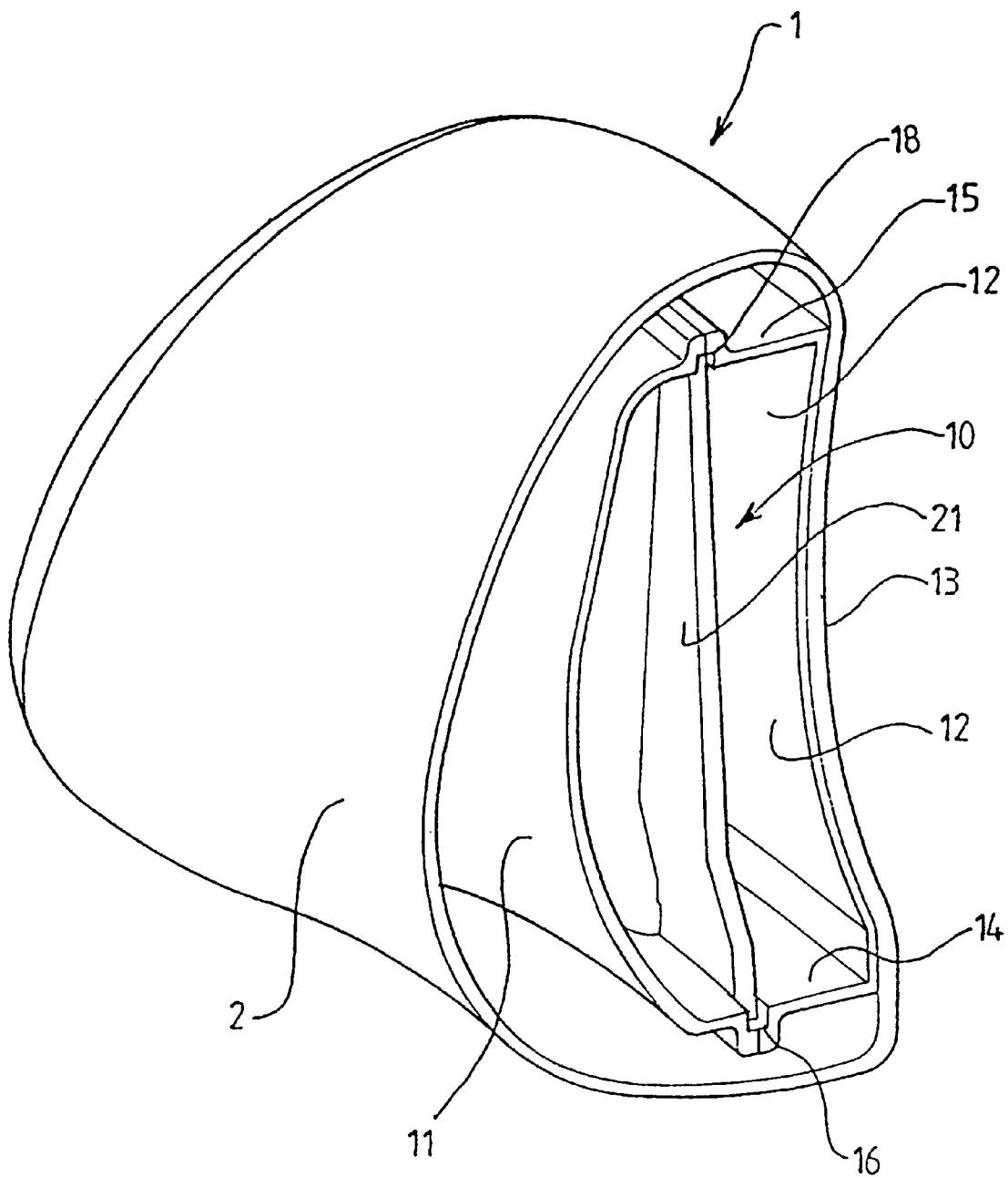
FIG. 3 is a view showing part of the head-rest of FIGS. 1 and 2 (with parts being cut away for the sake of clarity of illustration) illustrating the interior of the head-rest.

Turning now to FIGS. 3 and 4, the front face 2 of the head-rest 1 is illustrated and comprises, as mentioned above, either fabric or a layer of a plastic material, or a layer of leather.

Contained within the head-rest is a support element 10, in the form of a hollow tubular housing, which extends transversely of the head-rest. The support element 10 has a front, substantially vertical wall 11. The front wall 11 is a rigid wall having an outwardly curving form, and is separated from the front face 2 of the head-rest by padding.

The support element 10 has a rear vertical wall 12. The rear wall 12 is located at the rear part of the headrest 1 and is covered by a region 13 of the fabric or layer of plastic, or layer of leather, that form the front face 2 of the head-rest.

The support element 10 also includes a lower wall 14 which inter-connects the front wall 11 and the rear wall 12, and an upper wall 15 which also inter-connects the front wall 11 and the rear wall 12. The lower wall 14 has defined therein two arcuate grooves, 16,17, located at respective opposed ends of the support element 10 and extending generally axially of the support element. The arcuate grooves are symmetrically arranged, and lie on a common arc. The upper wall 15 also has two arcuate grooves formed therein, only one of which, 18, is visible in FIG. 3. The arcuate grooves in the upper wall 15 overlie the arcuate grooves 16,17 in the lower wall.

The arcuate grooves, as described above, define rails which support the extendable elements 6 and 7.

Figure 4A:
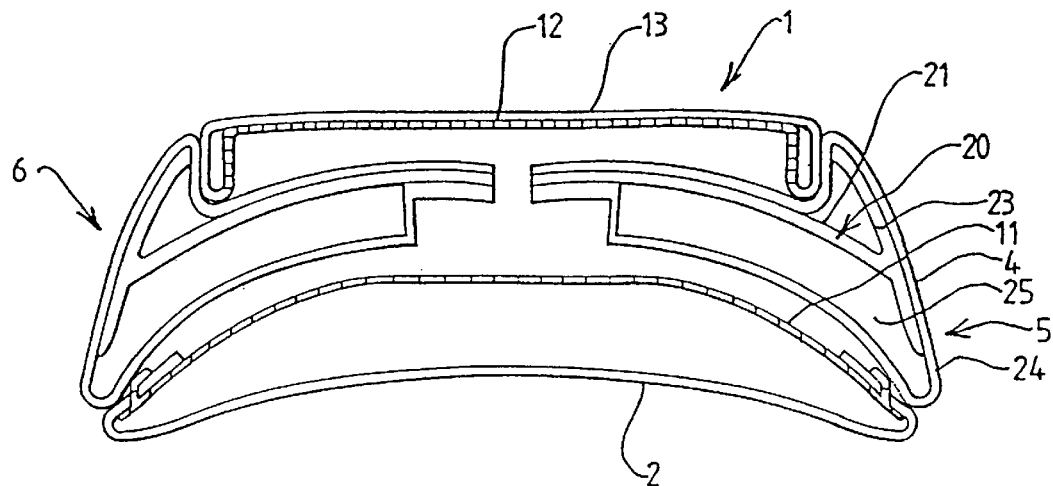
FIG. 4A is a horizontal sectional view of the head-rest in the condition of FIG. 1.
Figure 4B:
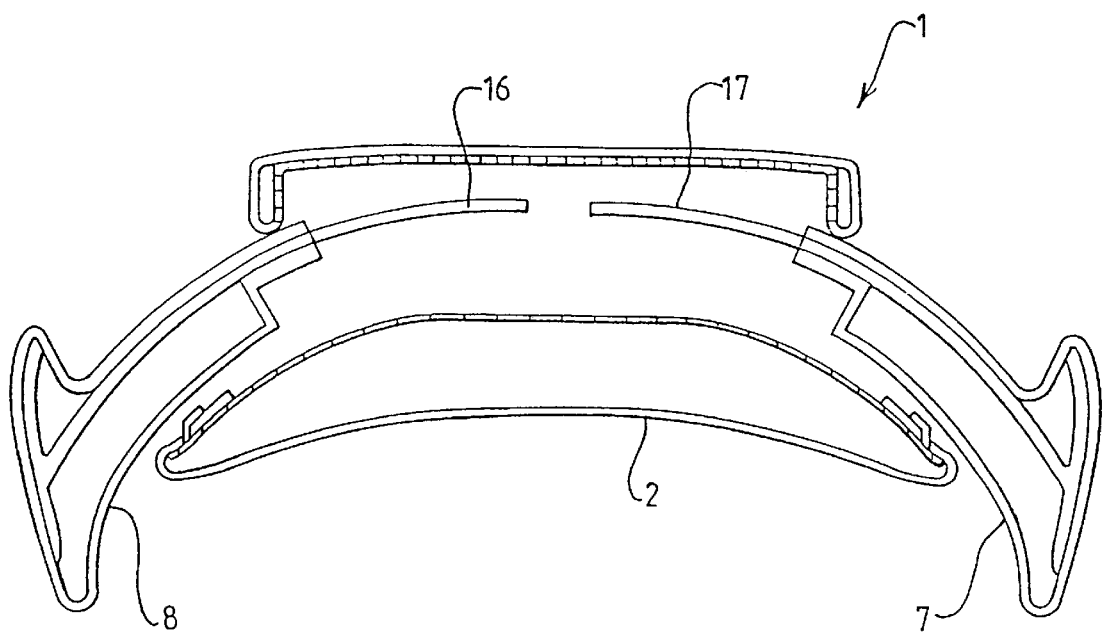
FIG. 4B is a horizontal sectional view of the head-rest in the condition of FIG. 2.

As can be seen most clearly in FIGS. 4A and 4B, each of the extendable elements 5 and 6 comprise an inner metal core 20. The inner metal core defines a vertical arcuate plate 21. The radius of curvature of the arcuate plate is the same as the radius of curvature of the arcuate grooves. The upper and lower edges of the arcuate plate 21 are received within the arcuate grooves 16,17,18, so that each metal core 20 may slide along the rail defined by the grooves.

Each metal core also defines an axially extending end piece 23 which extends axially of the seat to which the head-rest is fitted and substantially transversely to the arcuate plate 21. The metal core is provided with an outer covering 24 formed of fabric or a layer of plastic which may simulate leather, or a layer of real leather. The outer covering 24 lies adjacent the rear surface of the arcuate plate 21 and then passes adjacent to the exterior of the end piece 23. The fabric or layer of plastic or layer of leather 24 then extends in front of the metal core 20 and is separated therefrom by means of padding 25. This part of the fabric or layer of plastic or layer of leather thus provides an upholstered front face 7,8 for the extendable elements.

The extendable elements are moved from the retracted position as shown in FIG. 1 and FIG. 4A, by manually grasping the exposed end parts of the extendable elements and applying an appropriate force, causing the elements to slide, in an arcuate manner, along the rails defined by the arcuate recesses 16,17,18. As can be seen from FIG. 4B, when the extendable elements are in the extended position, each element presents a relatively comfortable upholstered front face 7,8, which effectively forms a forwardly and laterally extending projection of the front face 2 of the head-rest. Thus, the head-rest provides a substantial degree of comfort to a person who wishes to use the head-rest as a support for the head whilst sleeping.

The extendable elements may be mechanically interconnected, so that when one of the elements is grasped and moved, the other element simultaneously executes an equivalent movement. Means, such as a motor driving pinions which engages rocks carried by each extendable element, to drive the extendable elements between the extended and retracted positions.

What is claimed is:

1. A head-rest for a motor vehicle seat comprising a front face adapted to support the head of an occupant of the seat; side parts located on either side of the front face; and two extendable elements located on either side of the head-rest, each extendable element being adapted to move from a retracted position to an extended position, the extendable elements being adapted to move, with an arcuate sliding motion, from the retracted position through the side parts of the head-rest to an extended position in which the elements extend laterally relative to the head-rest and forwardly relatively to the head-rest.

2. A head-rest according to claim 1 wherein each extendable element comprising means adapted to engage a rail of arcuate form associated with the head-rest, each element being movable in a slidable manner along the rail.

3. A head-rest according to claim 2 wherein the rail is defined within the head-rest.

4. A head-rest according to claim 2, wherein the rail comprises two opposed arcuate recesses, and each movable, extendable element has an arcuate plate with an edge opposing the arcuate plate of the other movable extendable element where the opposed edges of the arcuate plates are received within the opposed recesses.

5. A head-rest according to claim 4, further comprising a substantially tubular housing that extends transversely of the head-rest, the tubular housing having upper and lower walls, wherein the recesses are formed in the upper and lower walls of the substantially hollow tubular housing.

6. A head-rest according to claim 1, wherein each extendable element has a front face and the front face of each extendable element is upholstered.

7. A head-rest according to claim 3, wherein the rail comprises two opposed arcuate recesses, and each movable, extendable element has an arcuate plate with an edge opposing an edge of the arcuate plate of the other movable, extendable element where the opposed edges of the arcuate plates are received within the opposed arcuate recesses.

8. A head-rest according to claim 7, further comprising a substantially tubular housing that extends transversely of the head-rest, the tubular housing having upper and lower walls, wherein the recesses are formed in the upper and lower walls of the substantially hollow tubular housing.

* * * * *

UNITED STATES PATENT AND TRADEMARK OFFICE
CERTIFICATE OF CORRECTION

PATENT NO : 6,120,099
DATED : September 19, 2000
INVENTOR(S) : Karen Reikerås et al.

It is certified that error appears in the above-identified patent and that said Letters Patent are hereby corrected as shown below:

On the title page, change line [73] to read --Autoliv Development AB, Vårgårda; AB Volvo, Göteborg, both of Sweden--

On the title page, change line [30] to read --Sep. 24, 1996 [GB] Great Britain...................9619860--

Signed and Sealed this

Fifteenth Day of May, 2001

Attest:

NICHOLAS P. GODICI

Attesting Officer

Acting Director of the United States Patent and Trademark Office